United States Patent [19]

Solomon et al.

[11] Patent Number: 4,714,546
[45] Date of Patent: Dec. 22, 1987

[54] POTABLE WATER FILTER

[75] Inventors: Donald F. Solomon; Romona L. Solomon; Charlie J. Good, all of Hemet, Calif.

[73] Assignee: Newport Filters, Inc., Hemet, Calif.

[21] Appl. No.: 827,817

[22] Filed: Feb. 10, 1986

[51] Int. Cl.⁴ .............................................. B01D 29/26
[52] U.S. Cl. ................................... 210/137; 210/266; 210/438
[58] Field of Search ............... 210/669, 137, 266, 269, 210/282, 288, 315, 353, 409, 422, 438, 440, 493.1, 493.5, 439

[56] References Cited

U.S. PATENT DOCUMENTS

| | | | |
|---|---|---|---|
| 920,271 | 5/1909 | Coffin | 210/422 |
| 3,189,179 | 6/1965 | McMichael | 210/266 |
| 3,327,859 | 6/1967 | Pall | 210/266 |
| 4,557,829 | 12/1985 | Fields | 210/137 |

Primary Examiner—Ivars Cintins
Attorney, Agent, or Firm—Gordon L. Peterson

[57] ABSTRACT

A potable water filter comprising a housing having an inlet and first and second outlets, a tube in the housing having a peripheral wall, a passage extending through the tube, and an opening in the peripheral wall leading to the passage, a tubular pleated filter element surrounding the tube and a carbon filter element within the tube. Some of the water from the inlet flows through the tubular filter element and the carbon filter element to the second outlet. Another portion of the water from the inlet flows along the tubular filter element to flush the tubular filter element and then flows out the first outlet.

14 Claims, 4 Drawing Figures

U.S. Patent  Dec. 22, 1987  Sheet 1 of 2  4,714,546
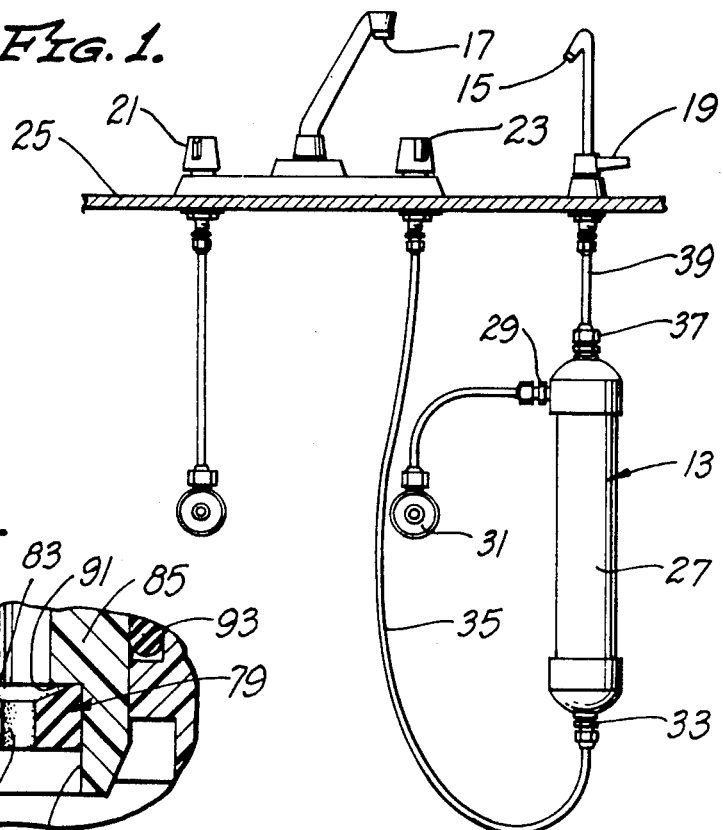
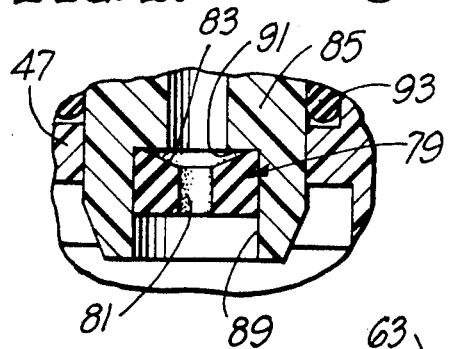
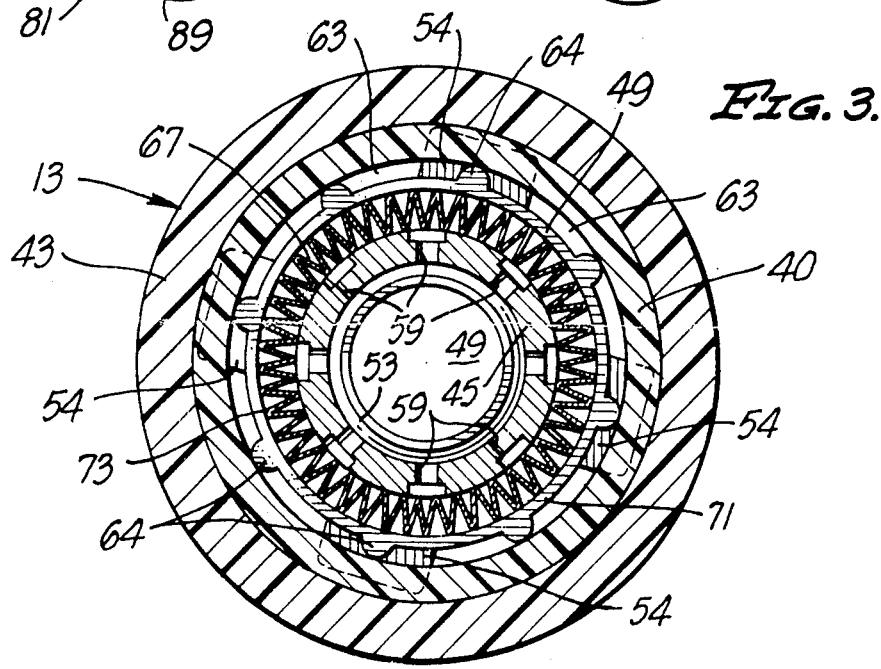

POTABLE WATER FILTER

BACKGROUND OF THE INVENTION

This invention relates to a potable water filter which can be used for domestic use. Water filters of this type may include a housing having an inlet and an outlet which are connected, respectively, to a source of water and a drinking water outlet. The water filter includes a carbon filter element or the like through which the water flowing to the drinking water outlet passes. A particle filter element may also be provided to filter the water flowing to the carbon filter element.

One problem with water filters of this type is that the particle filter element tends to become dirty or clogged with undissolved solids before the end of the useful life of the carbon filter element. Consequently, the useful life of the water filter is reduced. Although it is known to attack this problem by backflushing of the filter elements, this has the disadvantage of requiring a reversal of water flow through the filter. In addition, undesirable contaminant build-up can occur during the interval between backflushes. It is also known to flush the dissolved solids from a reverse osmosis water filter. However, this does not prolong the useful life of the particle filter which is located upstream from the reverse osmosis membrane.

To provide for at least a minimum residence time of the water in the carbon filter element, a flow regulator can be utilized. The flow regulator provides for an essentially constant flow rate through the filter when the drinking water valve is fully open, essentially independently of water pressure variations at the inlet or pressure drop across the filter elements. Although this is a desirable concept, prior art water filters have generally employed flow regulators which are relatively expensive and complex.

SUMMARY OF THE INVENTION

This invention extends the life of a water filter of the type described above by utilizing the water flowing to the tap water outlet of the housing to clean or flush the particle filter element. This increases the useful life of the particle filter element and, therefore, extends the life of the water filter.

This concept can be embodied, for example, in a water filter which includes a housing having an inlet and first and second outlets, a tube in the housing having a peripheral wall, a passage circumscribed by the peripheral wall and means forming an opening in the peripheral wall and leading to the passage, and means including the housing and the tube for forming a first flow path between the inlet and the first outlet. The passage is in essentially water tight communication with the second outlet so that the inlet communicates with the second outlet through a second flow path which includes a portion of the first flow path, the opening and the passage. A particle filter element, which is preferably a tubular pleated filter element, is in the first flow path for filtering water flowing to the opening. A second filter element is in the second flow path downstream of the particle filter element for filtering water flowing to the second outlet. The second filter element has different water filtering characteristics from the particle filter element and is of the type which should have a minimum residence time of the water in the filter element in order for the filter element to perform its function. A common filter of this type is a carbon water filter.

The particle filter element is exposed to water flowing through the first flow path to the first outlet so that the particle filter element is flushed by such flow to the first outlet. Preferably, the particle filter element does not filter water flowing to the first outlet but only filters water flowing to the second filter element.

The particle filter element preferably surrounds the tube and is pleated. In order to facilitate the flow of water passing through the particle filter element, the tube has one or more grooves in the outer surface of its peripheral wall that leads to the opening to the passage within the tube. This groove enables water passing through the particle filter element at any region along the length of the filter element to enter the groove and flow to the opening in the tube. If the particle filter element is pleated longitudinally, the groove preferably extends both axially and circumferentially of the tube so that the pleats are properly supported and do not extend into the groove.

This invention also reduces the cost and complexity of the water filter by providing a simple, inexpensive flow regulator. The flow regulator is deformable and deforms in accordance with the differential pressure across it to maintain an essentially constant flow rate through the second filter element essentially independently of water pressure variations at the inlet or pressure drop across the filter elements.

The invention, together with additional features and advantages thereof, may be understood by reference to the following description taken in connection with the accompanying illustrative drawing.

BRIEF DESCRIPTION OF THE DRAWINGS

FIG. 1 is an elevational view partially in section of a water filter constructed in accordance with the teachings of this invention installed in a domestic environment.

FIG. 3 is a sectional view taken generally along line 3—3 of FIG. 2.

FIG. 4 is an enlarged, fragmentary view of a region of the water filter.

DESCRIPTION OF THE PREFERRED EMBODIMENT

Figure 2:
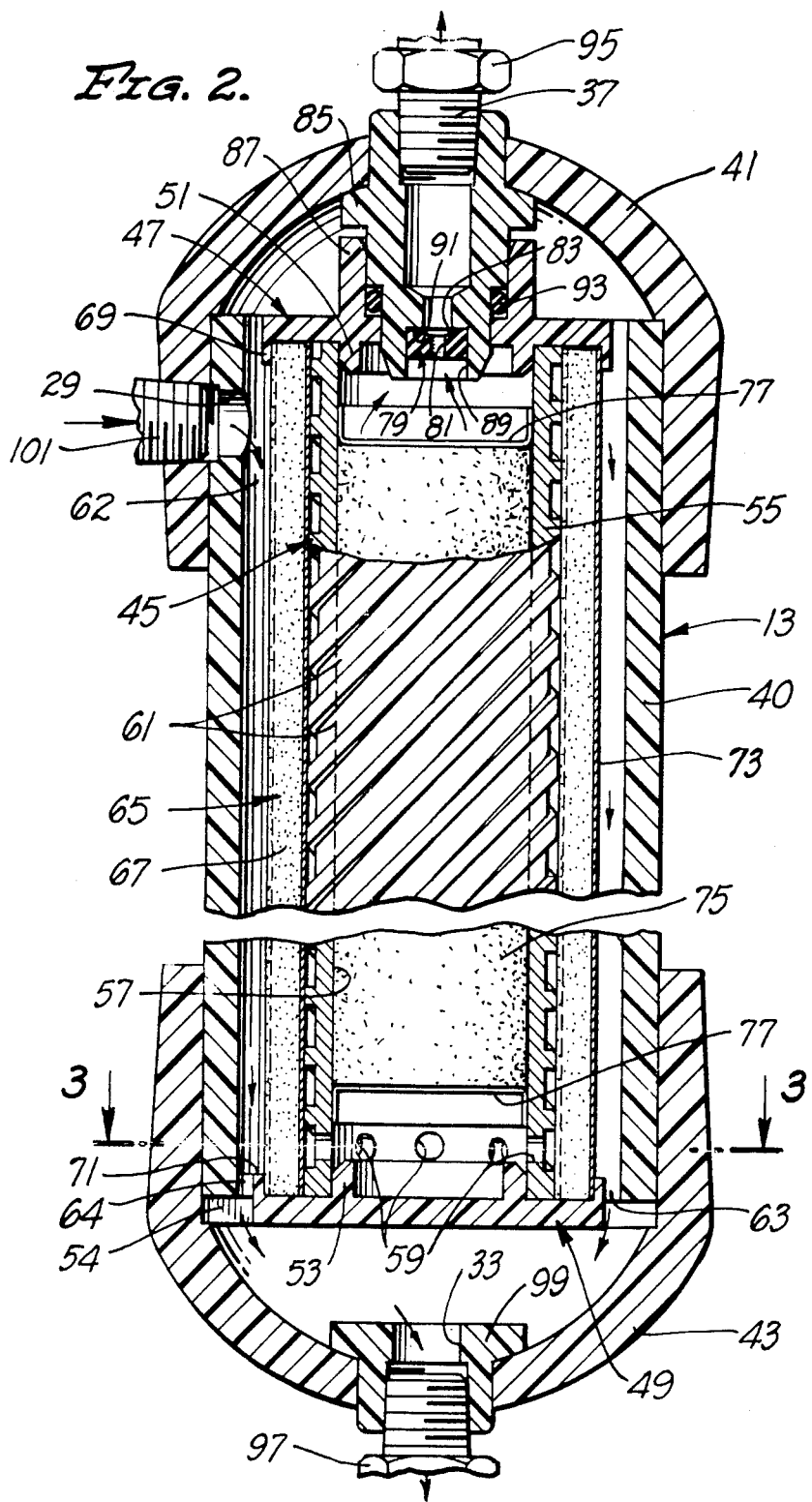
FIG. 2 is a longitudinal sectional view through a preferred form of water filter.

FIG. 1 shows a domestic water system 11 which includes a water filter 13, a drinking water outlet 15, a tap water outlet 17, a drinking water valve 19, tap water valves 21 and 23 for hot and cold water, respectively, and a suitable support, including a sink 25 on which components of the water system is mounted. The water filter 13 includes a housing 27 having an inlet 29 coupled to a source of cold tap water through shut-off valve 31, a first outlet 33 coupled by tubing 35 to the tap water valve 23 and a second outlet 37 coupled by tubing 39 to the drinking water valve 19. As described more fully hereinbelow, the water filter 13 is arranged to provide unfiltered water to the tap water outlet 17 and filtered water to the drinking water outlet 15.

Although the housing 27 can be of different constructions, in the embodiment illustrated, it includes a section of plastic pipe 40 and plastic end caps 41 and 43 adhered thereto. The inlet 29 extends through both the end cap 41 and the pipe 40, and the outlets 33 and 37 extend through the end caps 43 and 41, respectively.

A tube 45 of plastic material is mounted coaxially within the housing 27 between the end plates 47 and 49. The end plate 47 is suitably attached as by an adhesive to the tube 45 and a particle filter element 65. The end plate 49 has flanges 54 (FIGS. 2 and 3) which are clamped between the other end of the pipe 40 and an internal shoulder of the end cap 43. The tube 45 is internally supported by annular ribs 51 and 53 on the end plates 47 and 49, respectively.

The tube 45 has a peripheral wall 55 surrounding a cylindrical passage 57 and an opening in the form of a plurality of apertures 59 closely adjacent one end of the tube. A plurality of helical grooves 61 extend along the outer surface of the peripheral wall 55 for the full length of the tube 45.

The tube 45 is spaced radially inwardly from the housing 27 to define an annular space 62 which forms a portion of a first flow path that extends from the inlet 29 to the first outlet 33 and includes the openings 63 between ribs 64 (FIG. 3) of the end plate 49 and the end cap 43. The passage 57 within the tube 45 is in essentially water tight communication with the second outlet 37 by virtue of being adhered to the annular rib 51 and by virtue of having its other end sealed and closed by the end plate 49. Accordingly, the inlet 29 communicates with the second outlet 37 through a second flow path which includes a portion of the first flow path, the apertures 59 and the passage 57.

A particle filter element 65 is provided in the annular space 62 between the housing 27 and the tube 45 to filter the water flowing to the apertures 59. The particle filter element 65 can be any type which will filter out particulate material and, in the preferred embodiment, is in the form of a tubular, pleated filter element surrounding and contiguous the tube 45. The particle filter element 65 may be constructed of a variety of materials, such as paper or a suitable plastic material, and in this embodiment has pleats 67 which extend axially or longitudinally of the tube 45 for the full length of the tube. For example, the particle filter element 65 may be a spun, bonded polymer, such as Typar, having pores which may be as small as one micron. The particle filter element 65 can be mounted in any suitable manner and, in this embodiment, is retained axially between the end plates 47 and 49 and radially by the tube 45 and by peripheral flanges 69 and 71 on the end plates 47 and 49, respectively.

The particle filter element 65 has an outer peripheral surface 73 which is spaced radially inwardly from the housing 27 so that water traveling from the inlet 29 to the first outlet 33 can pass freely over the outer peripheral surface 73 and flush debris and particulate matter from such outer peripheral surface. Although it is possible that some water flowing from the inlet 29 to the first outlet 33 may pass through the particle filter element 65 and then back out into the stream of water flowing to the first outlet 33, it is contemplated that water flowing to the outlet 33 will be substantially unfiltered by the particle filter element 65.

The particle filter element 65, and in particular, the pleats 67 thereof, do not block the peripheral groove 61. Consequently, water passing through the particle filter element 65 anywhere along the length of the tube 45 can enter the grooves and flow to the apertures 59.

A second filter element 75 is provided downstream of the particle filter element 65, and in this embodiment, the second filter element is retained within the passage 57 of the tube 45. The filter element 75 has different water filtering characteristics from the particle filter element 65. Although the second filter element 75 could be, or include, a reverse osmosis membrane, preferably it is an activated carbon filter which can enhance the taste of the water and remove certain chemical contaminants. For example, the filter element 75 could include silver coated on carbon and/or antibacterial resins impregnated in the carbon. As such, this kind of filter element requires that the water have a certain minimum residence time within it in order that the proper and complete filtering action can be carried out. In this embodiment, the filter element 75 is cylindrical and completely fills a substantial length of the passage 57 and is retained in the passage 57 by porous retainers 77 at its opposite ends.

A flow regulator 79 assures that the water passing through the filter element 75 will have at least a minimum residence time therein. The flow regulator 79 is in the form of a deformable, cylindrical rubber or plastic washer having a central orifice 81 which opens downstream into a conical recess 83 which widens radially as it extends downstream. For example, the flow regulator 79 may be of the type manufactured by Vernay Laboratories. The flow regulator 79 is carried by a tubular fitting 85 which is received within an annular boss 87 of the end plate 47 and is attached to the end cap 41. More specifically, the flow regulator 79 is received within an inwardly opening cylindrical cavity 89, and the conical recess 83 faces a rigid, annular shoulder 91 of the fitting. An annular seal 93 seals the interface between the fitting 85 and the boss 87.

In use of the water system 11, when the user opens the drinking water valve 19, water flows from the inlet 29 through the particle filter element 65, the grooves 61, the apertures 59, the filter element 75, the orifice 81 and the tubing 39 to the drinking water outlet 15. If the differential pressure across the flow regulator 79 is relatively high as would occur when the water pressure at the inlet 29 is high and/or when the filter elements 65 and 75 are relatively clean, the flow regulator is forced against the shoulder 91 and deformed to reduce the diameter of the orifice 81. In this event, the flow regulator acts to reduce water flow therethrough to maintain a residence time of the water in the filter element 75 which is at least equal to the minimum desired residence time. On the other hand, if the pressure at the inlet 29 is relatively low, such as when either or both of the filter elements 65 or 75 are partially clogged, the differential pressure across the flow regulator 79 is reduced. Consequently, the deformation of the flow regulator and the resulting constriction provided by the orifice 81 is reduced so that the water flow rate through the filter element 75, with the valve 19 open, is maintained essentially constant essentially independently of water pressure variations at the inlet 29 or the pressure drop across the filter elements 65 and 75.

If the tap water valve 23 is opened, water flows from the inlet 29 through the annular space 62 between the housing 27 and the filter element 65, the openings 63, the outlet 33 and the tubing 35 to the tap water outlet 17. As described above, this water is essentially unfiltered by the filter elements 65 or 75. However, this flow of water longitudinally of the pleats 67 and the filter element 65 flushes debris and particulate material from the particle filter element 65 to clean it and extend its useful life.

The tubing 35 and 39 can be coupled to the water filter 13 in any suitable manner, such as by fittings 95 and 97 threaded into the outer end of the fitting 85 and into a separate internally threaded fitting 99 carried by the end cap 43. Another suitable fitting 101 may be utilized at the inlet 29.

It should be understood that the flow regulator features of this invention, such as use of the deformable flow regulator 79, can be employed with or without the particle filter element 65 and with or without the grooves 61 on the tube 45. In addition, the use of the grooves 61, which extend both axially and circumferentially, can be used with a longitudinally pleated filter element either with or without the flushing of the filter element 65, the second filter element 75 and the flow regulator 79. Of course, in the preferred form of the invention, all of the features are utilized together.

Although an exemplary embodiment of the invention has been shown and described, many changes, modifications and substitutions may be made by one having ordinary skill in the art without necessarily departing from the spirit and scope of this invention.

We claim:

1. A potable water filter comprising:
   a housing having an inlet and first and second outlets;
   a tube in said housing and having a peripheral wall, a passage circumscribed by the peripheral wall and means forming an opening in the peripheral wall and leading to the passage whereby water from said inlet can flow in a direction having an axial component along the tube to the opening;
   means including said housing and said tube for forming a first flow path between the inlet and the first outlet;
   said passage being in essentially water tight communication with said second outlet whereby said inlet communicates with the second outlet through a second flow path which includes a portion of the first flow path, the opening and the passage;
   a particle filter element in the first flow path for filtering water flowing to said opening;
   a second filter element in the second flow path downstream from the particle filter element for filtering water flowing through the second opening, said second filter element having different water filtering characteristics from the particle filter element; and
   said particle filter element being exposed to water flowing through the first flow path to the first outlet whereby the particle filter element is flushed by such flow to the first outlet.

2. A water filter as defined in claim 1 wherein said particle filter element includes a tubular pleated filter element surrounding the tube and the second filter element includes a carbon filter element in said passage of said tube.

3. A water filter as defined in claim 2 wherein said tube has means in the outer surface of the peripheral wall defining at least one groove which extends both axially and circumferentially of the tube.

4. A water filter as defined in claim 1 wherein said particle filter element includes a tubular filter element surrounding the tube and said tube has means in the outer surface of the peripheral wall defining at least one groove leading to said opening.

5. A water filter as defined in claim 1 including a deformable flow regulator in the second flow path which deforms in accordance with the differential pressure across it to maintain an essentially constant flow rate through the second filter element essentially independent from the water pressure variations at the inlet or pressure drop across the filter elements.

6. A water filter as defined in claim 5 wherein said tube is closed at one end and is in water tight communication with the second outlet at the other end thereof, said second filter element includes a carbon filter element in said passage of the tube, said particle filter element includes a tubular pleated filter element surrounding the tube and said tube has means in the outer surface of the peripheral wall defining at least one groove leading to said opening.

7. A water filter as defined in claim 1 wherein said tube is closed at one end and is in water tight communication with the second outlet at the other end thereof, said second filter element includes a carbon filter element in said passage of the tube, said particle filter element includes a tubular pleated filter element surrounding the tube and said tube has means in the outer surface of the peripheral wall defining at least one groove leading to said opening, and said particle filter element filters the water flowing to said opening without filtering water flowing to said first outlet.

8. A water filter as defined in claim 1 wherein said opening and said second filter element are positioned so that water flowing through said opening flows through substantially the full length of the second filter element in flowing to the second outlet.

9. A potable water filter comprising:
   a housing having an inlet and first and second outlets;
   a tube in said housing and having a peripheral wall, a passage circumscribed by the peripheral wall and means forming an opening in the peripheral wall and leading to the passage;
   means including said housing and said tube for forming a first flow path between the inlet and the first outlet;
   said passage being in essentially water tight communication with said second outlet whereby said inlet communicates with the second outlet through a second flow path which includes a portion of the first flow path, the opening and the passage;
   a tubular particle filter element surrounding the tube in the first flow path for filtering water flowing to said opening;
   a second filter element in the second flow path downstream from the particle filter element for filtering water flowing to the second opening, said second filter element having different water filtering characteristics from the particle filter element; and
   said tube having means in the outer surface of the peripheral wall defining at least one groove extending in a direction having an axial component and leading to said opening.

10. A water filter as defined in claim 9 wherein the tubular particle filter element is pleated and said groove extends both axially and circumferentially of the tube.

11. A water filter as defined in claim 9 including a deformable flow regulator in the second flow path which deforms in accordance with the differential pressure across it to maintain an essentially constant flow rate through the second filter element essentially independent of water pressure variations at the inlet or pressure drop across the filter elements.

12. A potable water filter comprising:
   a housing having an inlet, an outlet and a flow path extending from the inlet to the outlet;
   a filter element in said flow path of the type which has a minimum residence time of water passing therethrough in order to properly filter the water; and a deformable flow regulator in the flow path which deforms in accordance with the differential pressure across it to maintain an essentially constant flow rate through the filter element essentially independent of water pressure variations at the inlet whereby the minimum residence time can be maintained even if water pressure variations at the inlet occur.

13. A potable water system comprising:

a housing having an inlet and a drinking water outlet;

a drinking water valve;

conduit means for coupling the outlet to the valve so that there is a flow path between the inlet and the valve;

a filter element in said housing between said inlet and said outlet, said filter element being of the type which has a minimum residence time of water passing therethrough in order to properly filter the water; and a deformable flow regulator in the flow path which deforms in accordance with the differential pressure across it to maintain an essentially constant flow rate through the filter element essentially independent of water pressure variations at the inlet whereby the minimum residence time can be maintained even if water pressure variations at the inlet occur.

14. A water system as defined in claim 13 wherein the housing has a tap water outlet and said system includes a tap water valve, conduit means for coupling the tap water outlet to the tap water valve, a tube in said housing and having a peripheral wall, a passage circumscribed by the peripheral wall and means forming an opening in the peripheral wall and leading to the passage, said filter element being in said tube and a particle filter element in the housing and outside the tube between the inlet and the tap water outlet.

* * * * *